United States Patent [19]

Kapland et al.

[11] Patent Number: 4,504,321

[45] Date of Patent: Mar. 12, 1985

[54] PROCESS FOR TREATING AND STABILIZING CHROMIUM ORE WASTE

[75] Inventors: Mitchell A. Kapland, Annapolis, Md.; Melville W. Robinson, Jr., Beaver, Pa.

[73] Assignee: Trident Engineering Associates, Inc., Annapolis, Md.

[21] Appl. No.: 581,419

[22] Filed: Feb. 17, 1984

[51] Int. Cl.$^3$ ............................................. C04B 23/00
[52] U.S. Cl. .................................................. 106/117
[58] Field of Search .................... 106/89, 97, 117; 210/670, 710, 721

[56] References Cited

U.S. PATENT DOCUMENTS

| | | | |
|---|---|---|---|
| 3,947,284 | 3/1976 | Kitsugi et al. | 106/89 |
| 4,132,558 | 1/1979 | Uchikawa et al. | 106/89 |
| 4,284,514 | 8/1981 | Wright | 210/721 |
| 4,338,134 | 7/1982 | Zumunster | 106/97 |
| 4,377,483 | 3/1983 | Yamashita et al. | 210/670 |
| 4,404,105 | 9/1983 | De Lockerente et al. | 210/710 |
| 4,443,260 | 4/1984 | Miyoshi et al. | 106/117 |

*Primary Examiner*—James Poer
*Attorney, Agent, or Firm*—Cushman, Darby & Cushman

[57] ABSTRACT

The solids content of toxic waste chromium ore waste and of certain types of mud or sludge dredged from salty or brackish water are combined together and stabilized in a hardened state by adding to the settled volume of the mixed materials about 5% to about 30% by weight of the solids of finely ground basic granulated blast furnace slag, with intimate mixing, and maintaining the mixture in a quiescent state to produce a sedentary mass having load supportive properties suitable as landfill and whose impermeability effectively prevents leaching of any chromium ore waste by contact with surface or ground water. In this process for producing a sedentary and essentially impermeable load bearing mass toxic hexavalent chromium in the chromium ore waste is reduced to less or non-toxic trivalent chromium.

9 Claims, No Drawings

PROCESS FOR TREATING AND STABILIZING CHROMIUM ORE WASTE

The present invention relates to a process for treating wastes, particularly by reducing toxic hexavalent chromium in chromium ore wastes to trivalent chromium, by admixing said waste with mud or sludge dredged from muck- or sludge-containing waters including salty or brackish water or even fresh or swamp waters and with granulated blast furnace slag, to produce a solid mass or aggregate wherein the chromium values therein are essentially non-toxic, said solid mass or aggregate having low permeability and high load bearing characteristics.

BACKGROUND OF THE INVENTION

The need for an economically attractive and environmentally acceptable process for treating wastes, particularly chromium ore wastes, has grown more pressing. Indeed, states have strict environmental regulations; see, for instance, Code of Maryland Regulations, 10.51.02.17F, and appendices thereto and Samplers and Sampling Procedures for Hazardous Waste Streams, EPA 600/02-80-018 (January 1980).

Serious environmental problems are currently being experienced because of the waste products resulting from the processing of chromium ore. Chrome ore is generally processed on an industrial scale by high temperature alkaline roasting under oxidizing conditions. The sodium chromate formed thereby is leached from the roast and converted to bichromate via acid treatment, and thence to chromic acid via a separate acid treatment. In proceeding through the roasting and acid treatment steps, there is generated a final leached waste residue containing residual toxic hexavalent chromium values which present a significant disposal problem.

Various processes for treating these waste materials have focused on complex and costly procedures.

Such known processes include forming a mixture of the waste material, a silicate, and a cementitious agent in the presence of water and allowing the mixture to harden into an aggregate of stoney concretion wherein the pollutant waste is said to be encapsulated. Although the thus obtained aggregates satisfy certain standards required for environmental protection, such aggregates suffer from major drawbacks in that rupture or fragmentation, resulting from transportation or actual use, will release the encapsulated toxic waste from the stoney concretion. The thus released toxic substances may once again present an environmental hazard particularly if the waste material contaminates ground water, streams, rivers, lakes and the like. A further drawback of such processes resides in the fact that after a period of time the concretions exhibit or undergo disintegration, thereby again releasing toxic materials to the surrounding environment.

Other processes focus on achieving a chemical reaction between metallic ions and substantially-monosilicic or disilicic acid which is said to thereafter polymerize the waste material into a disposable form. An example of such a process is described in U.S. Pat. No. 4,404,105 (1983). One of the drawbacks to this process is that the reaction is apparently slow, is competitive with alternative reaction mechanisms, and requires specific adequate physical chemical conditions in order to avoid gel formation.

A still further process for pretreating hazardous waste comprises placing unopened waste containers in a vessel containing a liquid pretreatment media therein and subjecting the so situated containers to an agitation process which ruptures the unopened containers so as to deposit the contents thereof into the vessel for reaction with the liquid pretreatment media. Such a process is described in U.S. Pat. No. 4,284,514 (1981).

Another procedure, described in U.S. Pat. No. 4,377,483 (1983), comprises using slag from steel manufacture to remove heavy metals contained in waste water such that the metals are absorbed on the slag. The slag is then formed into solid blocks, ballast or aggregate by admixture with Portland cement or alumina cement.

An alternative process, described in U.S. Pat. No. 3,803,032 (1974), comprises treating harmful water soluble chromates contained in water-leached residue from the roasted product obtained by alkali oxidizing roasting of chrome ore to insolubilize and fix said chromate in said residue by mixing lumpy and/or powdery water-leached residue with organic materials capable of being converted into active carbon, roasting the thus formed mixture in a gaseous atmosphere having low oxygen concentration at a gas temperature of from 400° to 1000° C. and a material temperature of 400° C. to 700° C. and thereafter quenching the thus roasted product.

Other efforts to effect treatment of waste solutions are described in U.S. Pat. No. 3,755,530 (1973) which teaches removing solids from waste solutions of metal finishing processes by freezing globules or droplets from the solutions and removing the solvent from the frozen globules or droplets via sublimation.

However, none of these prior art processes provides a disposal method as efficient or as economically attractive as the present invention especially when consideration is given to the fact that the present invention not only significantly or essentially completely reduces the toxicity of the hexavalent chromium values of a waste material component but also provides, ultimately, a product which has good load supportive properties when combined with mud or sludge dredged from salty or brackish water or even fresh or swamp water and finely ground basic granulated blast furnace slag.

Heretofore, in the dredging of harbors or other bodies of water for the purpose of deepening the channels to improve navigation or for the installation of large pipes or tunnels, large quantities of accumulated slimy sludges or bay muds must be removed. These sludges or muds contain very finely divided suspended solid particles. Such solids, because of their finely divided physical state, are not usable as a landfill material in that they have poor load supportive properties. Consequently, a distressing sludge disposal problem is presented.

The present invention thus provides a solution to both the chromium ore waste treatment problem and the sludge and mud disposal problem.

SUMMARY OF THE INVENTION

The present invention relates to a process for the treatment and neutralization of toxic chromium ore wastes wherein said toxic hexavalent chromium is significantly or essentially completely reduced to trivalent chromium, said process comprising admixing said toxic chromium ore waste material with mud or sludge dredged from salty or brackish water or even fresh or swamp water and with finely ground basic granulated blast furnace slag so that the resultant mixed solids content of these materials forms a sedentary highly impermeable mass suitable as a stable load bearing landfill material.

The resulting highly impermeable solidified mass, produced in accordance with the present invention, is far less prone to the effects of leaching, thus resulting in a decreased contamination of ground water by the components present in the solidified mass.

Further, the present invention provides a highly impermeable and load supportive mass which is ideally suited as a landfill material, said mass comprising an admixture of neutralized or essentially non-toxic chromium ore waste, sludge or mud and granulated glassy blast furnace slag.

DETAILED DESCRIPTION OF THE INVENTION

The present invention relates to a process for treating chromium ore wastes to reduce toxic hexavalent chromium to less or non-toxic trivalent chromium, said process comprising admixing said chromium ore waste with mud or sludge dredged from salty or brackish water or even fresh or swamp water and with about 5% to about 30% by weight, relative to the combined solids content of the chromium ore waste and sludge or mud, of finely ground basic granulated glassy blast furnace slag, and maintaining the resulting admixture in a quiescent state for a time sufficient to produce a sedentary mass having load supportive properties suitable as landfill and having sufficiently low permeability characteristics such that undue leaching of chromium values by contact with surface or ground water is essentially prevented. Preferably, the admixture is treated to yield a high pH.

The solids content of said mixture of chromium ore waste and bay, river or pond dredgings is generally 15% to 50% of said mixture. On intimate admixture thereto of finely granulated blast furnace slag in an amount of 5% to 30% by weight percent based on the weight of the said chromium ore waste-sludge or mud solids, the resulting admixture, after having been deposited in the desired area and maintained in a quiescent state, forms a firm highly impermeable mass capable of supporting loads.

The relative amounts of the waste chromium ore and bay, river or pond dredgings may vary. For instance, about 1 pound to about 2 pounds chromium ore waste on a dry solids basis to about 4 pounds of bay, river or pond dredgings yields advantageous results according to the present invention. More preferably in accordance with the present invention, for instance, on admixture of the chromium ore waste with bay, river or pond dredgings, the resultant mixture can contain chromium ore ranging from 10% to 125%, on a dry solids basis of the dry solids content of the bay, river, or pond dredgings.

Aqueous sludges from dredging of bays, rivers, and ponds which are employed to provide load supportive masses in accordance with the present invention, consist principally of clays, shell, and partially or fully decomposed organic materials. For the purpose of the present process, the solids content of the sludge should contain between about 15% and about 50% solids. In some instances, the solids content of the sludge may vary. For example, the sludge as it is dredged up may contain, due to dilution from the dredging operation, as little as 2% solids, which after being placed in a pond and allowed to settle, or after treatment by mechanical settling means, may increase to about 15% to about 50%. Even with such natural and/or mechanical settling, the resultant sludge remains as a soft, unstable semi-liquid, and will not attain sufficient load bearing strength to be suitable as a load bearing material for use as a landfill. These sludges generally contain very small particle size solids with a significant portion being less than 10 microns in size.

Mineral analysis of mud samples dredged from the Chesapeake Bay are as follows:

TABLE I

| MINERAL ANALYSIS OF SAMPLES A AND B | | |
|---|---|---|
| MINERAL | Sample A % Weight Dry | Sample B % Weight, Dry |
| Silica, $SiO_2$ | 59.95 | 54.83 |
| Alumina, $Al_2O_3$ | 14.32 | 17.33 |
| Titania, $TiO_2$ | 0.99 | 1.10 |
| Iron, $Fe_2O_3$ | 6.05 | 6.31 |
| Lime, CaO | 0.25 | 62 |
| Magnesia, MgO | 0.97 | 1.55 |
| Potassium, $K_2O$ | 1.85 | 2.45 |
| Sodium $Na_2O$ | 1.37 | 1.42 |
| Sulfur, $SO_3$ | 1.46 | 3.76 |
| Phosphorous, $P_2O_5$ | 0.05 | 0.16 |
| Permanganate, $MnO_4$ | 0.06 | 0.26 |
| Zinc, ZnO | 0.02 | 0.072 |
| Lead, Pb | 0.005 | 0.025 |
| Copper, Cu | 0.018 | 0.025 |
| Sulfite, $SO_3 =$ | 0.20 | 1.60 |
| Carbon dioxide, $CO_2$ | 0.28 | 0.40 |
| Sulfide, $S = (\mu g/g)$ | 134.0 98.0 | 216.0 |
| Loss on ignition (1100° C.) | 12.40 | 10.04 |

Further analysis of sample A showed, respectively, a total carbon weight percent of 2.69 and 2.75 and a oil weight percent/by heptane extraction of 0.35 and 0.39.

Particle size analysis of sludge or mud samples usefully employed in the present invention has also been conducted. Microtrac particle size analysis using a Leeds & Northrup Microtrac Particle Size Analyzer gave the following results:

TABLE II

| PARTICLE SIZE ANALYSIS | | |
|---|---|---|
| | Cumulative % Smaller Than Indicated Size | |
| Particle Size | Sample A | Sample B |
| 88 micron | 100.0% | 100.0% |
| 62 micron | 100.0% | 100.0% |
| 44 micron | 95.4% | 98.3% |
| 31 micron | 90.7% | 90.8% |
| 22 micron | 83.8% | 82.4% |
| 16 micron | 74.3% | 72.8% |
| 11 micron | 63.8% | 61.7% |
| 7.8 micron | 52.4% | 50.7% |
| 5.5 micron | 41.8% | 38.7% |
| 3.9 micron | 27.1% | 23.8% |
| 2.8 micron | 13.5% | 11.7% |
| mean diameter | 12.4μ | 12.4μ |

Both samples show essentially identical particle size distribution and 90% of the total volume of solids are less than 60 microns diameter.

Furthermore, 10% of the total volume of solids is less than 2.5μ.

The settling characteristics of the above sludge or mud samples were also established.

Sample A was diluted to 18.8% solids and a settling test was performed in a one liter graduated cylinder. After 153 days (5 months) settling, the solids had settled to a measured 28.1% solids content in the bottom of the cylinder.

With regard to Sample B, after months of settling it contained 27.5% solids and had no free supernatant water. Thus it appears that this fine material will achieve a maximum of only approximately 30% solids by free settlement in settling ponds.

Thus it can be seen that on depositing, mechanically or naturally, the above sludge or mud in a quiescent zone or container yields a soft semistable liquid having no utility as a load bearing landfill material.

However, when in accordance with the present invention said sludge or mud is admixed with chrome ore wastes and finely ground granulated blast furnace slag, a firm stable mass capable of supporting loads and having low permeability characteristics is produced.

The blast furnace slag employed in the present invention can be obtained from a variety of sources as would be appreciated by those skilled in this art. For instance, blast furnace slag is often employed as an additive in Portland cement. Typically quench slag contains particles having a particle size ranging from about $5\mu$ to $15\mu$ in diameter. More particularly, the slag should be composed of particles having a surface area ranging from about 1,800 cm$^2$/gram to about 6,000 cm$^2$/gram. The surface area preferably ranges from about 3,000 cm$^2$/gram to 5,000 cm$^2$/gram. In producing the highly impermeable and load supportive mass of the present invention, however, Portland cement itself is not satisfactory.

Addition of various quantities of slag material to a mixture of sludge or mud and chromium ore wastes is possible. Generally speaking about 5 to 30% by weight of granulated blast furnace slag based on the weight of the solids in the chromium ore waste and sludge yields an acceptable product having desirable load bearing properties and minimal permeability. A more preferred range is from 6 to 15% by weight granulated blast furnace slag. Below about 6 weight percent slag the sludge becomes difficult to stabilize.

Upon admixing the slag, sludge (or mud) and chromium ore waste, the resultant non-solidified admixture is basified with the addition of, for instance, lime. The pH may range from about 9 to about 12, and more particularly it may range from about 10 to 12. Preferably the pH is about 11.

The load bearing properties of the final highly impermeable and load supportive mass of the present invention generally are sufficient for such uses as driveways and golf courses. Increasing the load bearing properties from 1,000 lb/ft$^2$ generally requires the addition of more granulated blast furnace slag. For instance, the use of 10 weight percent granulated blast furnace slag in the present process can yield after about 28 days a mass having a load bearing strength of about 9,000 lb/ft$^2$. The use of 8 weight percent granulated blast furnace slag can yield an ultimate product having a load bearing strength of 3,000 lb/ft$^2$ or greater.

Typically, the unconfined compressive strength of the ultimate product according to the present invention exceeds 1 ton/ft$^2$ and its bulk density exceeds 60 lbs/ft$^3$.

As indicated above, the load supportive product made according to the present invention has a very low permeability generally equal to a low grade clay and is in the range of $1 \times 10^{-4}$ cm/sec to $1 \times 10^{-7}$ cm/sec.

Significantly, and surprisingly, as noted above the process of the present invention effects a reduction of $Cr^{+6}$ in the chromium ore waste to $Cr^{+3}$ which substantially eliminates and/or reduces toxic waste problems attributable to the presence of hexavalent chromium. The complete disclosures of Marine Chemistry, pp. 565-572 (1982) and 13 Marine Bulletin No. 3, pp. 77-78 (1982) are incorporated herein by reference.

Most commercial manufacture of sodium dichromate and other chromium compounds generally employs some variant of the following procedure. The starting material is chromite which is a chromium iron oxide containing about 50% $Cr_2O_3$ with the remainder being primarily FeO, $Al_2O_3$, $SiO_2$ and MgO. The ore is then ground to 200-mesh, mixed with ground limestone and soda ash and roasted at approximately 2200° F. in a strongly oxidizing atmosphere. The sintered mass is crushed and leached with hot water to separate out soluble sodium chromate. The sodium chromate solution is then treated with enough sulfuric acid to convert the chromate to dichromate, with the resulting formation of sodium sulfate. Most of the sodium sulfate crystallizes in the anhydrous state from the boiling-hot solution during acidification, and the remainder drops out in the evaporators on concentrating the dichromate solution. From the evaporator the hot saturated dichromate solution is fed to a crystallizer, then to a centrifuge and dryer. The most significant differences among manufacturers are believed to be in the amount of lime which is used in the mix formulation.

The analysis of a typical chromium ore waste sample following drying and calcining at 100° C. is as follows:

TABLE III

|  | WT. % |
|---|---|
| CaO | 38 |
| $Fe_2O_3$ | 23 |
| $Al_2O_3$ | 15 |
| MgO | 10 |
| $SiO_2$ | 3 |
| $Na_2O$ | 2 |
| Cr as $CrO_3$ - Hexavalent | 2 |
| Cr as $Cr_2O_3$ - Trivalent | 3 |
| Loss on ignition | 5 |

TABLE IV

| SPECTROGRAPHIC ANALYSIS | |
|---|---|
|  | WT. % |
| Mn | 0.2 |
| Pb | — |
| Ni | 0.2 |
| Co | — |
| Cu | 0.002 |
| V | 0.08 |
| Ti | 0.08 |
| Zn | — |
| Ba | 0.006 |
| Sr | 0.02 |
| Ag | — |
| Cd | — |
| Mo | — |
| Sn | 0.02 |

TABLE V

| Rational Composition | |
|---|---|
| $C_4AF$ (4CaO.$Al_2O_3$$Fe_2O_3$) | 40-45% |
| $C_3AH_6$ (3CaO.$Al_2O_3$.6$H_2O$) | 20% |
| $C_2F$ (2CaO.$Fe_2O_3$) | 10% |
| $C_2S$ (2CaO.$SiO_2$) | 10% |
| MgO | 10% |
| $Cr_2O$ + ore | 2% as $Cr^{(iii)}$ |
| $Na_2CrO_4$ | |
| 3CaO.$Al_2O_3$.CaCrO$_4$.12$H_2O$) | 1% as $Cr^{(vi)}$ |

TABLE V-continued

Rational Composition $Ca_3(CrO_4)_2$

Waste ore obtained from conventional chromium ore having characteristics similar to the above chromium ore sample can advantageously be utilized in accordance with the present invention.

The following non-limiting examples illustrate the present invention.

Example A

The following tabulated tests were undertaken to illustrate the significant or essentially complete reduction of toxic hexavalent chromium values in chrome ore wastes by combining the same with sludge or mud dredged from salty or brackish water and identified as Samples A, B, and C, with or without granulated glassy blast furnace slag. Mud Samples A and B are essentially the same as those identified above while mud Sample C is similar to Sample B. The amount of this reduction was established in accordance with EPA test procedures set forth, for instance in the Federal Register, Vol. 45, No. 98, May 19, 1980, 33127–33128.

the dry solids content of the bay mud-chromium ore waste mixture. Hydrated lime was added to adjust the pH to a value of 11. The mixture was placed in a covered plastic beaker and stored at 72° F. and 100% humidity. The degree of sedentation was measured with a Model CL700 soil test penetrometer over a period of time to illustrate the sedentation. Another sample of the same mixture was placed in a permeability tester. At the end of a 21-day period, the penetrometer reading for the hardened mass was 1.6 tons per square foot. At the end of the same period, the constant head, Darcy's Permeability Coefficient "K" with a 15 psi head, was 1.9 to $2.3 \times 10^{-6}$ cm per second.

What is claimed is:

1. A method for treating and stabilizing chromium ore wastes comprising the combination of steps of:
   (i) admixing said chromium ore waste with mud or sludge dredged from mud- or sludge-containing water wherein said mixture has a solids content from 20% to 80%, said mixture containing chromium ore waste measured on a dry solids basis ranging from 10% to 125% of the dry solids content of said mud or sludge;
   (ii) intimately admixing to the resulting mixture of step (i) ground granulated blast furnace slag in an

| Test No. | Mud Type/ % solids | Chrome Ore Tailings Size/wt % | Granulated Blast Furnace Slag % by wt of mud solids | Time Prior to EPA Test | Total chrome, ppm | Remaining Hexavalent chrome, ppm |
|---|---|---|---|---|---|---|
| 1. | Sample A/ 32% solids | −8 mesh/ 100% | 30% | 125 days | 11.0 | 0.24 |
| 2. | Sample B/ 32% solids | −8 mesh/ 25% | 15% | 150 days | 1.0 | >0.01 |
| 3. | Sample B/ 33% solids | −8 mesh/ 25% | 15% | 180 days | 9.4 | 0.01 |
| 4. | Sample A/ 30% solids | −4 mesh/ 25% | 0 | 1 day | 9.0 | 5.0 |
| 5. | Sample B/ 30% solids | −4 mesh/ 25% | 0 | 1 day | 4.0 | 0 |
| 6. | Sample A/ 30% solids | −16 mesh/ 25% | 0 | 1 day | 15.8 | 10.0 |
| 7. | Sample B/ 30% solids | −16 mesh/ 25% | 0 | 1 day | 3.8 | 1.2 |
| 8. | Sample A/ 30% solids | −4 mesh/ 25% | 0 | 7 days | 11.9 | 5.0 |
| 9. | Sample C/ 33% solids | −4 mesh/ 25% | 0 | 1 day | 10.3 | >0.05 |
| 10. | Sample C/ 33% solids | −4 mesh/ 25% | 15% | 1 day | 0.03 | <0.05 |
| 11. | Sample C/ 33% solids | −16 mesh/ 25% | 0 | 1 day | 8.3 | <0.05 |
| 12. | Sample C/ 33% solids | −16 mesh/ 25% | 15% | 1 day | <0.03 | <0.05 |
| 13. | Sample C/ 33% solids | −4 mesh/ 25% | 0% | 1 week | 27.7 | 7.5 |
| 14. | Sample C/ 33% solids | −4 mesh/ 25% | 15% | 1 week | 0.3 | <0.05 |
| 15. | Sample C/ 33% solids | −16 mesh/ 25% | 0 | 1 week | 14.7 | <0.05 |
| 16. | Sample C/ 33% solids | −16 mesh/ 25% | 15% | 1 week | <0.06 | <0.05 |

Example B

Bay mud, containing 32% solids having an analysis substantially similar to the afore-described Sample A and Sample B, was mixed together with chromium ore waste containing 15% by weight moisture in a proportion of 4 pounds of bay mud solids content on a dry basis, to 1 pound of waste chromium ore on a dry basis. To the resulting mixture was added ground granulated glassy blast furnace slag in an amount equal to 15% of amount ranging from 5 to 30 weight percent based on the total solids content of said mixture resulting from step (i); and (iii) maintaining the mixture resulting from step (ii) in a quiescent state whereby said mixture resulting from step (ii) sets so as to yield a solid mass having low permeability and high load bearing characteristics.

2. A process according to claim 1 wherein said blast furnace slag has a surface area of about 1,800 to 6,000 cm$^2$/gram.

3. The process according to claim 1 wherein the mixture resulting from step (ii) is maintained in a quiescent state for a period of time sufficient so that the resulting solid mass exhibits a permeability to the passage of aqueous liquors in the range of $1 \times 10^{-4}$ cm/sec to $1 \times 10^{-7}$ cm/sec and a load bearing strength of at least 1,000 lb/ft$^2$.

4. Process according to claim 1 wherein (a) said admixture of step (i) contains about 25 to about 50 percent by weight chromium ore waste on a dry solids basis based on said sludge and (b) said mixture of step (ii) contains about 5 to about 15 weight percent of said slag based on the total solids content of said chromium ore waste and said sludge.

5. A highly impermeable and load supportive mass containing essentially non-toxic chrome values and suitable as a landfill obtained by:
(i) admixing chromium ore waste with mud or sludge dredged from salty or brackish water wherein said mixture has a solids content from 20% to 80%, said mixture containing chromium ore waste measured on a dry solids basis ranging from 10% to 125% of the dry solids content of said mud or sludge;
(ii) intimately admixing to the resulting mixture of step (i) ground granulated blast furnace slag in an amount ranging from 5 to 30 weight percent based on the total solids content of said mixture resulting from step (i); and
(iii) maintaining the mixture resulting from step (ii) in a quiescent state, whereby said mixture resulting from step (ii) sets to thereby yield a highly impermeable and load supportive mass suitable for a landfill.

6. A highly impermeable and load supportive mass according to claim 5 wherein mass contains about 25 to 50 percent of said chromium ore or a dry solids basis based on said sludge and about 6 to about 15 weight percent of said slag.

7. A highly impermeable load bearing mass suitable as a landfill and containing essentially non-toxic chrome values comprising an admixture of mud or sludge dredged from salty or brackish water, about 10 to about 125 weight percent of chromium ore waste, on a dry solids basis of the dry solids of said mud or sludge, and about 5 to about 30 weight percent of ground granulated blast furnace slag relative to the combined solids content of said chromium ore waste and said mud or sludge, said mass having a permeability to the passage of aqueous liquors in the range of $1 \times 10^{-4}$ cm/sec to $1 \times 10^7$ cm/sec and a load bearing strength of at least 1,000 lb/ft$^2$.

8. A load bearing mass according to claim 7, wherein said slag is present in an amount ranging from about 6 to about 15 weight percent based on the total solids content of said chromium ore waste and said sludge.

9. A load bearing mass according to claim 7 wherein said chromium ore waste is present in an amount of about 25 weight percent to about 50 weight percent on a dry solids basis of said mud or sludge.

* * * * *